Sept. 7, 1954 E. KITTELSON 2,688,226
CROP GUIDE FOR WINDROWERS
Filed March 12, 1952 2 Sheets-Sheet 1
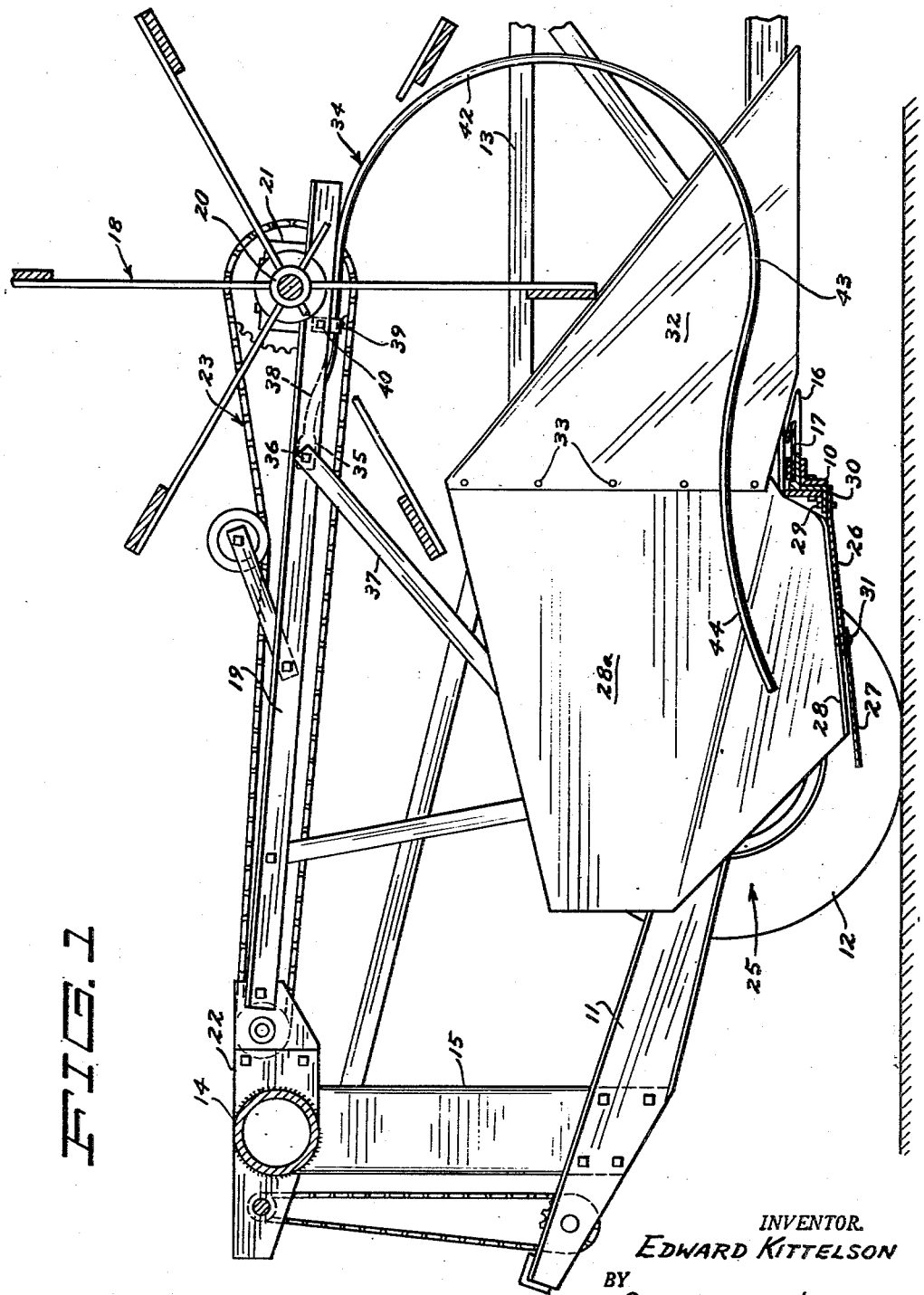
INVENTOR.
EDWARD KITTELSON
BY
Carlsen + Hogle
ATTORNEYS Sept. 7, 1954        E. KITTELSON        2,688,226
CROP GUIDE FOR WINDROWERS
Filed March 12, 1952        2 Sheets-Sheet 2
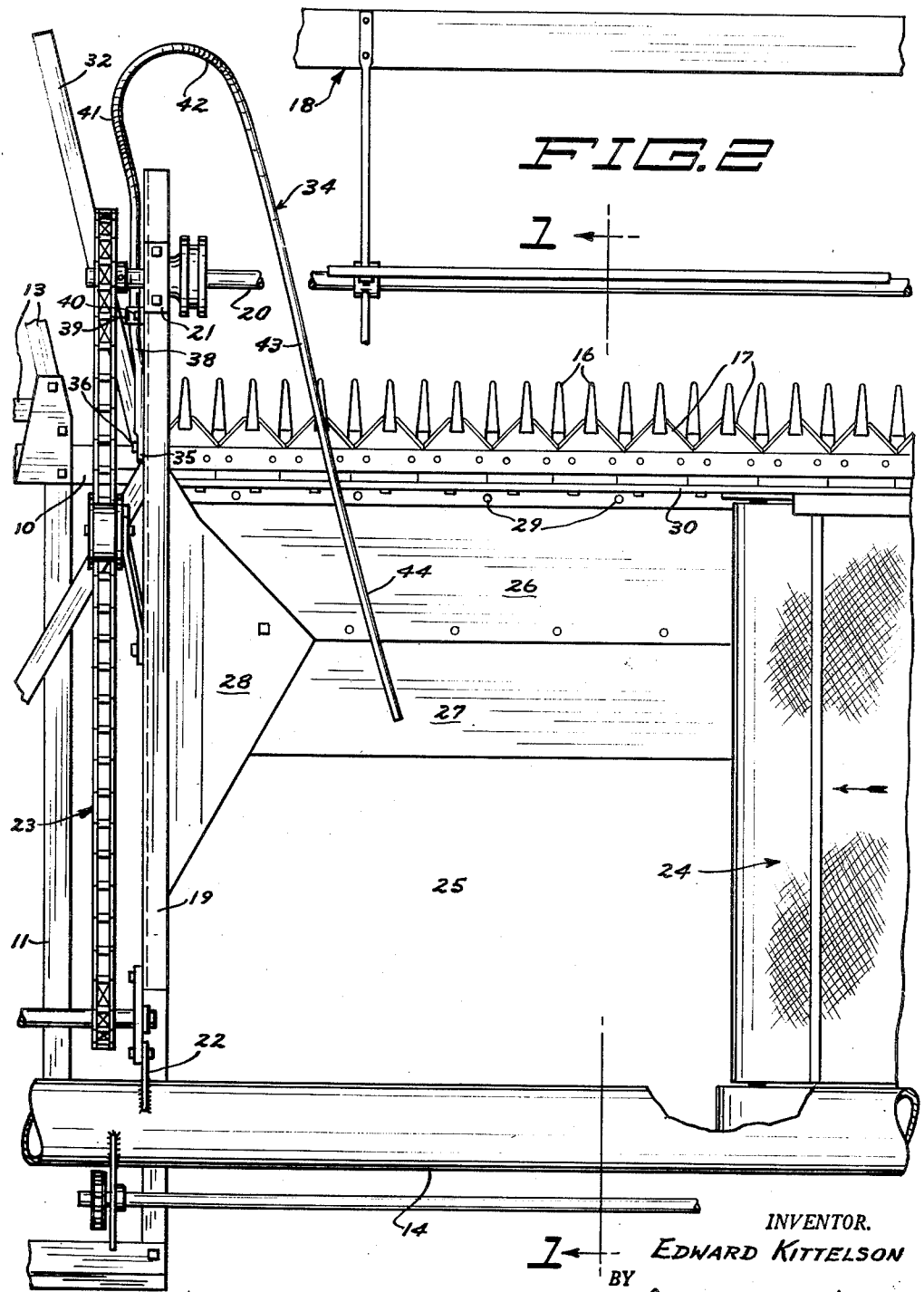
INVENTOR.
EDWARD KITTELSON
BY
ATTORNEYS Patented Sept. 7, 1954

2,688,226

UNITED STATES PATENT OFFICE 2,688,226

CROP GUIDE FOR WINDROWERS

Edward Kittelson, Litchfield, Minn.

Application March 12, 1952, Serial No. 276,129

3 Claims. (Cl. 56—192)

This invention relates to improvements in windrowers, or windrow harvesters, of the general type disclosed in the Korsmo et al. Patent No. 2,071,844, issued February 23, 1947.

This type of harvester is used for cutting grain and similar field crops and depositing the grain in a windrow upon the stubble, so that it may dry and cure to best advantage. This harvesting operation generally precedes the final harvesting of the grain by a combine and the windrower comprises a transversely elongated frame carried by wheels at each end and generally pulled by a tractor to which connection is made from one end of the frame. This end is generally referred to as the inner or stubbleward end of the windrower. A sickle extends along the forward edge of the frame for cutting the grain over a wide swath and running inwardly from the outermost or grainward end is an apron conveyor or canvas which receives crop material from the sickle and moves the same inwardly for deposit upon the stubble in the form of a windrow. This conveyor terminates short of the inner end of the frame leaving an opening through which the cut crop may drop upon the stubble, and it will, of course, be understood that that portion of the grain cut immediately in front of this opening will fall more or less directly back upon the stubble. Difficulty has been encountered in operation of these machines in the delivery of the crop in an even and smooth windrow, due to the fact that a part of the grain is delivered off the discharge end of the apron conveyor and a part falls directly back from that portion of the sickle which lies in front of the discharge opening. It will, of course, be understood further that in accordance with conventional practice the machine includes a rotating reel positioned above and forwardly of the sickle for the usual purpose.

One chief difficulty which has arisen in the delivery of grain into a smooth windrow upon the stubble is the tendency of the grain cut immediately at the inner end of the sickle to so fall upon the windrow that a great number of the stalks or spears project out raggedly and fall down into the stubble. It is accordingly the primary object of my invention to provide means for overcoming this problem in an extremely simple and effective manner.

Another object is to provide what may be called a crop guide in the form of an irregularly bent and elongated rod which angles and curves outwardly and rearwardly from the innermost or stubbleward end of the machine, so that its rearward extremity angles downwardly over the sickle to a point above the opening through which the grain falls upon the stubble. This rod is then in a position to penetrate the standing grain immediately in front of the sickle and to bend and guide this grain in an outward or grainward direction as it is cut, so that the cut grain will fall over onto the windrow without leaving the ragged edge along the windrow, as is now common.

A further object of my invention is to provide a device of this nature and for this purpose which is attached to and movable with the frame carrying the reel, so that the position of the guide rod will be related to the elevation of the reel and therefore will operate to maximum advantage regardless of the height of the crop.

These and other more detailed and specific objects will be disclosed in the course of the following specification, reference being had to the accompanying drawings, in which Fig. 1 is a fragmentary longitudinal and vertical section through the stubbleward end of a conventional form of windrower, showing my invention as applied thereto, this view being taken through the grain discharge opening approximately on the line 1—1 in Fig. 2.

Fig. 2 is a fragmentary plan view of the inner end or stubbleward portion of the windrower, showing the delivery end of the apron conveyor and the opening through which the grain drops upon the stubble, as well as indicating the angle at which the crop guide forming my invention extends back above said opening.

Referring now more particularly and by reference characters to the drawing, the windrower is seen as comprising a front frame bar 10 which is carried at the forward ends of end frame bars, one of which appears at 11, and it will, of course, be understood that only the one inner end portion of the machine is here shown. The disclosure, however, is adequate for an understanding of the present invention and for a complete disclosure reference is invited to the prior patent hereinbefore identified. The frame bars 10 and 11 form elements of what may be referred to as a main frame which is carried at opposite ends upon ground wheels, one of which appears at 12 in Fig. 1. These wheels support the machine for travel movement over the field with the front frame bar 10 transverse to the direction of movement and usually the frame is so traveled by a connection to a tractor, which in the modern versions of such equipment also serves to power the various operating elements of the windrower from its power take-off shaft. The main frame thus includes at its inner or stubbleward end a forwardly extending draft frame, fragments of which are designated at 13, and the main frame also includes an elevated, transversely extending cross tube 14 connected to the bars 11 by a series of risers, one of which appears at 15. A cutting mechanism in the form of a reciprocating sickle extends along the front bar 10 and includes the usual guard fingers 16 and reciprocating sickle bar to which are attached the knives 17. Also forming part of the machine is the ordinary reel, designated generally at 18, which rotates above and forwardly of the sickle in order to properly lay the crop over to the rear as it is cut, and this reel is carried upon a movable reel frame including as here shown forwardly extending reel support arms, one of which appears at 19, and upon which the center shaft 20 of the reel is journaled in bearings 21. Each reel support arm 19 is pivotally attached at its rear end to brackets 22 welded to the cross tube 14 and an adjustment mechanism (not shown) is, of course, provided for raising and lowering the reel by swinging these arms about their pivots. Sprocket mechanism is also shown at 23 by which a drive connection is made to the inner end of the reel to rotate it in a clockwise direction as viewed in Fig. 1.

The cutting mechanism or sickle extends from a point below the innermost reel support arm 19 out to the outside or grainward end of the machine and the reel 18 is of approximately the same length. Thus it will be understood that the machine will cut a swath of very substantial width, but all of the grain thus cut is not deposited directly upon the field but is brought together into a comparatively narrow windrow and for this purpose there is provided an apron conveyor or canvas only the inner end of which appears at 24. This conveyor operates immediately behind the sickle and extends therefrom back beneath the cross tube 14 and a suitable driving connection (not shown) is made so that the upper flight of the conveyor will travel in an inward or stubbleward direction, as indicated by the arrow in Fig. 2. At its inner or delivery end the conveyor 24 terminates a substantial distance short of the inner end of the sickle thus leaving an opening 25, as viewed from above, through which the grain may drop onto the stubble. It will be noted in Fig. 1 that the cross tube 14 is located at an elevation such that it will not interfere with this delivery of the crop and that there is no transverse frame elements below the tube in line with the opening 25 for the same purpose, although, of course, from the inner end of the conveyor outwardly there will be depending supports analogous to the riser 15 for carrying the rear edge of the apron.

It will now be apparent that that portion of the grain which is cut in advance of the inwardly moving conveyor 24 will be carried inwardly thereby and will be discharged, along with the remaining portion of the cut grain, through the opening 25 in the form of a comparatively narrow windrow, as is desired. The purpose of this harvesting operation is to deposit the cut grain upon the stubble in such manner that air may circulate freely beneath the windrow and so that the grain will dry and cure to best advantage. A number of problems arise, however, in order to deliver the grain in a smooth windrow of as nearly even thickness throughout as possible and without bending over the springy stubble to a point where the stubble will not support the windrow and permit the desired air circulation through the grain. This problem is complicated by the fact that the grain, as it falls upon the forming windrow, is in part moving inwardly off the delivery end of the apron conveyor 24 and is in a lesser part falling rearwardly from the sickle immediately in front of the discharge opening 25. It is desirable that the grain be disposed on the stubble in as nearly a quiescent state as possible and experience has proven the advisability of the use of the three angled plates, designated at 26, 27 and 28 at the forepart of the opening 25 as here shown. The plate 26 spans the front end of the opening and is attached it its forward edge at 29 to an angle bar 30 which is secured along the rear of the front cross bar 10. From this edge the plate 26 angles downwardly and the plate thus acts to compress or bend over the tops of the stubble so that it is in best condition to receive and upwardly and yieldably support the forming windrow. The plate 27 is similar in function and, being attached at its forward edge at 31 to the rear edge of the plate 26, acts effectively as a rearward extension thereof. Under certain circumstances the plate 27 may, if desired, be omitted, since it is a separable part, as will be understood. The remaining plate 28 is a triangular, downward and outwardly angled extension of an inner end guide sheet 28ᵃ which prevents any possibility of grain falling inward at this end of the machine. The outward, downward angle of the plate 28 also assists in directing the very innermost stalks of grain outward onto the windrow as will be readily appreciated. Also forming part of this usual grain guiding assembly, at the inner or stubbleward end of the machine, is a forwardly and inwardly angled divider point 32, which is here shown as secured at 33 to the forward edge of the end sheet 28ᵃ, and this assembly is, of course, suitably fastened to the inner frame portion of the machine.

The foregoing construction still leaves much to be desired in the proper formation of the windrow under the widely varying crop conditions which are encountered and in many cases the windrow will have a ragged inner edge with projecting stalks or spears of grain which drop down into the stubble and interfere with air circulation. It is the purpose of my invention to overcome this remaining problem and I do so by the provision of a crop guide or guide rod, which is designated generally at 34, having one end flattened and apertured as seen at 35, so that it may be attached by a bolt 36 to the forward end portion of the reel support arm 19. In fact, the bolt 36 as here shown also mounts a diagonal brace 37 forming part of the conventional reel frame construction of the machine. From this point of attachment the rod 34 extends forwardly inside of the arm 19 and has a compound curved portion 38, so that immediately forward of the bolt 36 the rod is brought down slightly below the arm 19 and is also inset with respect thereto. This is for the purpose of accommodating a clamp band 39 which is placed around the rod at this point and has its ends attached by means of a bolt 40 to the arm 19 so that the rod is supported at two points and will retain its position with respect to the reel and the supporting framework thereof. From this attached end the rod 34 then bends inwardly a short distance, as indicated at 41 in Fig. 2, and then turns and curves smoothly downward in a deep forward bight portion 42 inside of the divider point 32.

The curvature of this bight portion 42 is such that the rod is brought down substantially below the lower portion of the reel 18 and this bight portion also angles in an outward or grainward direction, curving below the inner end of the reel so that as the lower end portion 43 of the rod passes rearward over the sickle it is spaced substantially outward from the inner end of the sickle. The rod is then completed in its formation by a trailing end 44 which curves very slightly in an outward direction as viewed from above, and terminates at a considerable distance behind the sickle, as seen in Fig. 2. As viewed from the side in Fig. 1 this trailing end portion 44 of the rod also curves upwardly where it passes above the sickle and then finally turns downwardly toward its rearward extremity.

The guide rod 34 thus shaped and positioned will run in the standing grain immediately in advance of the sickle and below the reel and the rearward-outward angle of the rod, as viewed from above in Fig. 2, is such that the grain cut at the immediate inner end of the sickle or the stubbleward edge of the swath will be bent over toward the outside of the swath and will, therefore, be laid over toward the central portion of the forming windrow. It is this grain cut immediately at the inner and stubbleward edge of the swath which has given the most difficulty with ragged windrows and experience has proven that this action of the guide rod very effectively guides this portion of the grain over into the best possible discharge position on the windrow. Inasmuch as the guide rod extends to the rear of the cutting mechanism or sickle it also acts upon the grain after it is actually cut with a continuation of the outward guiding effect and insures that all of this portion of the grain will be laid over smoothly and properly onto the windrow, as will be readily understood.

It is important to note that the guide rod or crop guide of my invention is secured to and moves with the reel assembly, so that its relationship with the reel remains constant but so that as the reel is adjusted a corresponding adjustment will be made of the crop guide. This is very desirable since the same reasons which ordinarily necessitate adjustment of the elevation of the reel will require a correlated adjustment of the guide rod in order to form the best windrow under all crop conditions. It will also be noted that my invention is extremely simple and its mounting is such that it may be readily adapted to harvesters now in use, or installed as original equipment as the case may be.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For use with a windrower of the character described having a sickle and reel and a conveyor operating traversely behind a portion of the sickle for delivering cut grain at a point of discharge behind one end of the sickle and depositing the crop in a windrow on the stubble, and the windrower also including a movable reel frame carrying the reel for up and down adjustment with reference to the sickle, the improvement which comprises a crop guide rod secured at one end to the reel frame at the stubbleward end of the windrower, the rod having a forward curved portion extending forwardly, downwardly and then rearwardly and a lower portion extending rearwardly beneath the reel and over the sickle, the rod also having a free and trailing rear end portion extending over the point of discharge of the grain and behind the sickle, and the lower and trailing portions of the rod extending at an angle rearward away from the stubbleward end of the windrower.

2. For a windrow harvester which includes a traveling frame and a transversely extending crop cutter, a transversely operating conveyor supported by the frame at the rear of the cutter and having a delivery end short of the stubbleward end of the cutter to lay the crop in a swath upon the stubble, and a reel and a reel frame adjustably supporting the reel for upward and downward movements with respect to the cutter; the improvement which comprises an elongated crop guide element secured at one end to the reel frame and movable bodily upward and downward as the reel is correspondingly adjusted, the said crop guide element extending downward from the end secured to the reel frame below the reel and rearwardly across the stubbleward end of the cutter at an angle to the direction of travel of the harvester to lay the crop cut by said stubbleward end of the cutter upon the swath.

3. For a windrower having a traveling frame and a crop cutter on the frame with stubbleward and grainward ends, a crop conveyor carried by the frame along the rear of the cutter and extending transversely to deliver the cut crop toward the stubbleward end of the cutter but said conveyor having a delivery end located short of the stubbleward end of the cutter, a reel frame adjustably carried by the traveling frame, a rotary reel supported by the reel frame above the cutter and adjustable up and down with respect to the cutter; the improvement which comprises an elongated crop guide rod and means securing one end of the rod to the reel frame over the stubbleward end of the cutter, the said rod extending from its secured end forward, downward and then rearward below the reel over the stubbleward end of the cutter and to a point rearwardly of the cutter, and the portion of the end passing below the reel and over the cutter also extending at an angle to the direction of travel and toward the delivery end of the conveyor.

References Cited in the file of this patent
UNITED STATES PATENTS

| Number | Name | Date |
|---|---|---|
| 368,890 | Irwin | Aug. 23, 1887 |
| 930,617 | Riley | Aug. 10, 1909 |
| 1,910,950 | Hans | May 23, 1933 |
| 1,917,352 | Apel | July 11, 1933 |
| 2,102,711 | Hume et al. | Dec. 21, 1937 |
| 2,398,389 | Oehler | Apr. 16, 1946 |
| 2,423,303 | Fienhold | July 1, 1947 |